United States Patent
Willis

(10) Patent No.: US 6,827,803 B1
(45) Date of Patent: Dec. 7, 2004

(54) METHOD OF JOINING BELT ENDS

(76) Inventor: John A. Willis, 6824 Graywalls Ln., Raleigh, NC (US) 27614

( * ) Notice: Subject to any disclaimer, the term of this patent is extended or adjusted under 35 U.S.C. 154(b) by 304 days.

(21) Appl. No.: 10/102,119

(22) Filed: Mar. 20, 2002

(51) Int. Cl.⁷ .............................................. B65H 69/06
(52) U.S. Cl. ...................... 156/157; 156/285; 156/286; 156/304.1; 156/304.6; 156/502; 156/580; 156/583.1
(58) Field of Search ................................ 156/157, 159, 156/228, 285, 286, 311, 304.1, 304.5, 304.6, 502–509, 580–583.9, 583.91; 100/315, 321, 324–326; 474/273

(56) References Cited

U.S. PATENT DOCUMENTS

| | | | |
|---|---|---|---|
| 4,287,015 A | | 9/1981 | Danner, Jr. |
| 4,334,850 A | * | 6/1982 | Garabedian ................. 425/388 |
| 4,450,034 A | | 5/1984 | Stern |
| 4,517,147 A | | 5/1985 | Taylor et al. |
| 4,554,036 A | | 11/1985 | Newsom |
| 4,836,765 A | | 6/1989 | Kornitzky et al. |
| 4,946,541 A | | 8/1990 | Thies et al. |
| 5,190,608 A | | 3/1993 | Darcy et al. |
| 5,292,388 A | | 3/1994 | Candore |
| 5,405,123 A | | 4/1995 | Mielenz |
| 5,562,796 A | | 10/1996 | Ertel |
| 5,944,947 A | | 8/1999 | Broomhall et al. |
| 5,974,935 A | | 11/1999 | Willis et al. |
| 6,142,206 A | * | 11/2000 | Ryan .......................... 156/504 |
| 6,228,200 B1 | | 5/2001 | Willis et al. |

* cited by examiner

Primary Examiner—Jeff H. Aftergut
Assistant Examiner—Jessica Rossi
(74) Attorney, Agent, or Firm—Coates & Bennett, PLLC

(57) ABSTRACT

A belt press use a combination of vacuum and atmospheric pressure to provide the majority of the compressive force between platens. A first platen has a substantially rigid proximal side and a plurality of vacuum ports communicating therewith. The compressive force is generated by pulling a vacuum at the vacuum ports associated with the first platen while allowing atmospheric pressure to act against its distal side. Heat may be applied via at least one of the platens while generating the compressive force. Evolved gases are vented via the vacuum ports while applying the heat by continuing to pull the vacuum during heating. When the now-joined belt ends have cooled after the application of heat, the compressive force is relieved by ceasing the pulling the vacuum at the vacuum ports associated with the first platen. The second platen of the belt press may be similar to the first platen.

7 Claims, 3 Drawing Sheets

METHOD OF JOINING BELT ENDS

BACKGROUND OF THE INVENTION

The present invention relates generally to presses for forming belt joints, and more particularly to a press typically used for joining belt ends to form a belt joint.

Belts, and more particularly conveyor belts, are typically manufactured in long strips which are spliced together in one or more locations to form a continuous loop. Due to the stresses imposed on the conveyor belts, it is important that the splice be as high a quality as possible so as to prevent, or at least delay, belt failure at the splice. Over time, a number of methods have been employed to splice belt ends together. The simplest method is the butt splice where the opposing ends of the belt are cut and then bonded together, such as by glue or stapling. Such butt splices are weak. Stronger splices are achieved when there is some sort of overlapping of the two belt ends, such as when the top half of one end and the bottom half of the other end are removed and the complementary portions of the ends are overlapped and bonded together by gluing, etc., and thereafter vulcanized with presses having heated platens. For some applications, it is desirable to form stepped splices having staggered overlapping levels, as disclosed in U.S. Pat. Nos. 5,974,935 and 6,228,200, incorporated herein by reference. In addition, the belt material of the complementary opposing ends may be formed into an interleaved finger arrangement.

A number of belt presses have been designed. Typically, such presses rely on either hydraulic pressure or inflatable bladders to supply the compression force between opposing platens. For instance, U.S. Pat. No. 4,946,541 to Thies et al. discloses a hydraulic press, while U.S. Pat. No. 5,562,796 to Ertel discloses a inflatable bladder press. Hydraulic presses suffer from the disadvantages of requiring extra equipment, such as hydraulic pressure sources, and being unduly complicated. Inflatable bladder presses likewise require additional equipment, such as high pressure air supplies, involve undue complexity, and suffer from the potential for bladder failure. In addition, both types of belt presses require strong, massive reinforcing structures to handle the forces within the presses. Such reinforcing structures are heavy, cumbersome to move, and typically requires extensive assembly on-site.

In light of the above, there remains a need for a simplified belt press which can provide reliable performance for forming belt joints.

SUMMARY OF THE INVENTION

The belt press of the present invention generates a compression force between press surfaces facing a belt material, for joining or repairing the belt material, by pulling a vacuum on one side of at least one substantially rigid platen. In this manner, the present invention utlizes a combination of vacuum and atmospheric pressure to provide the majority of the compressive force between platens of a belt press.

Two belt ends are disposed between first and second platens, the first and second platens having respective substantially rigid proximal sides. At least the first platen has a plurality of vacuum ports communicating with its proximal side. A compressive force is generated between the proximal sides of the first and second platens by pulling a vacuum at the vacuum ports associated with the first platen while allowing atmospheric pressure to act against a distal side of the first platen. The vacuum may be applied at both a first group of larger ports disposed generally proximate a perimeter of the proximal surface of the first platen and at a second group of ports, smaller in size, disposed inwardly from the first group. Heat may be applied to the two belt ends via at least one of the first and second platens while generating the compressive force. Evolved gases are vented via the vacuum ports while applying the heat by continuing to pull the vacuum during heating. When the now-joined belt ends have cooled after the application of heat, the compressive force is relieved by ceasing the pulling the vacuum at the vacuum ports associated with the first platen.

The second platen of the belt press may be similar to the first platen. Accordingly, the second platen may have a plurality of vacuum ports communicating with its proximal side and the compressive force may be generated between the proximal sides of the first and second platens by pulling a vacuum at the both the vacuum ports associated with the first platen and the vacuum ports associated with the second platen.

DETAILED DESCRIPTION

The present invention utilizes a combination of vacuum and atmospheric pressure to provide the majority of the compressive force between platens of a belt press 10. The belt press 10 may be used for joining new, or repairing old, conveyor belts or power transmission belts, and the like, but the invention is not so limited. For instance, the belt press 10 may be used to add or repair molding on belts, or to emboss belts, both of which fall within the scope of the present invention. The belt press 10 is particularly adapted for rubber belts, but may be used on belts of various thermoplastic materials.

Figure 1:
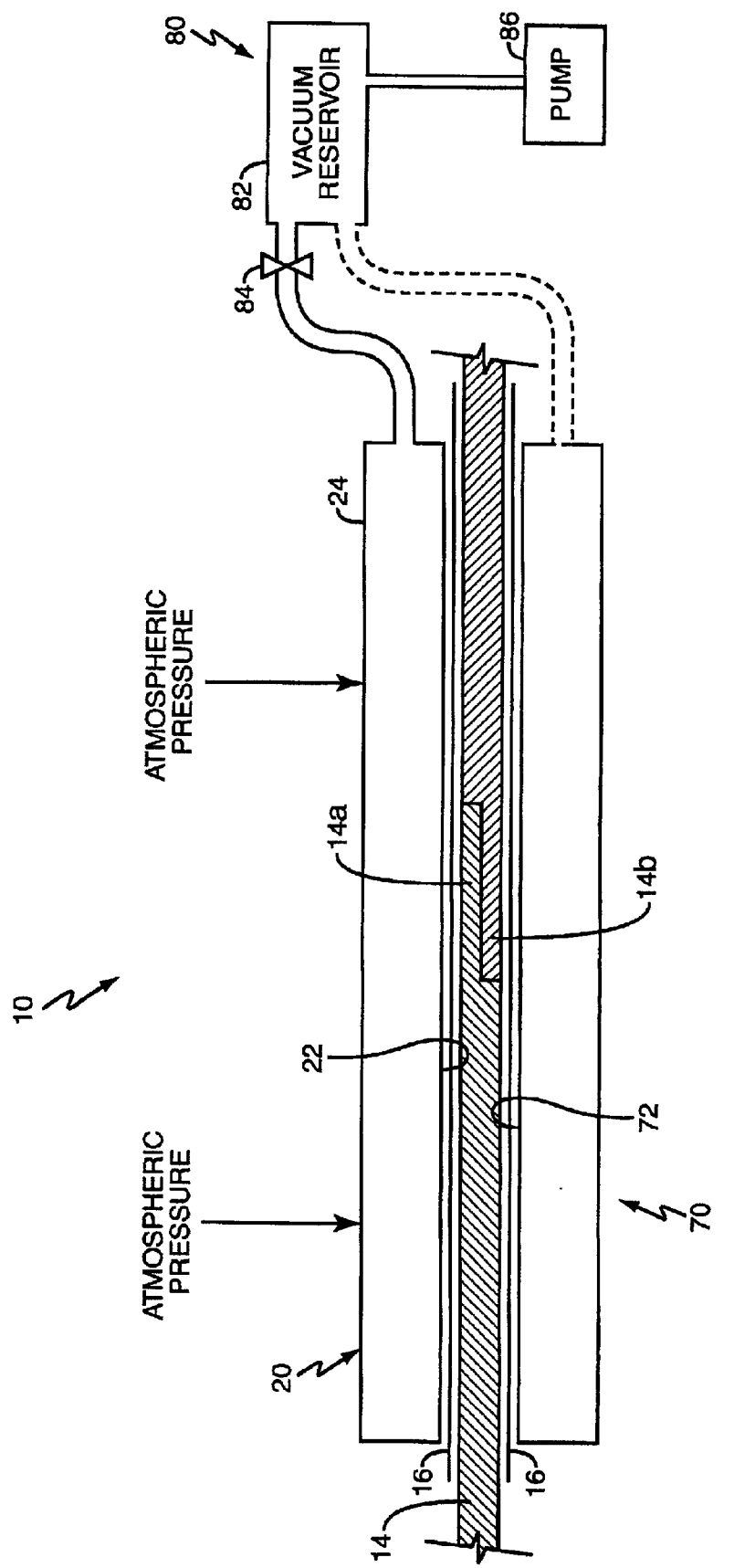
FIG. 1 is a side view of one embodiment of the belt press of the present invention.
Figure 2:
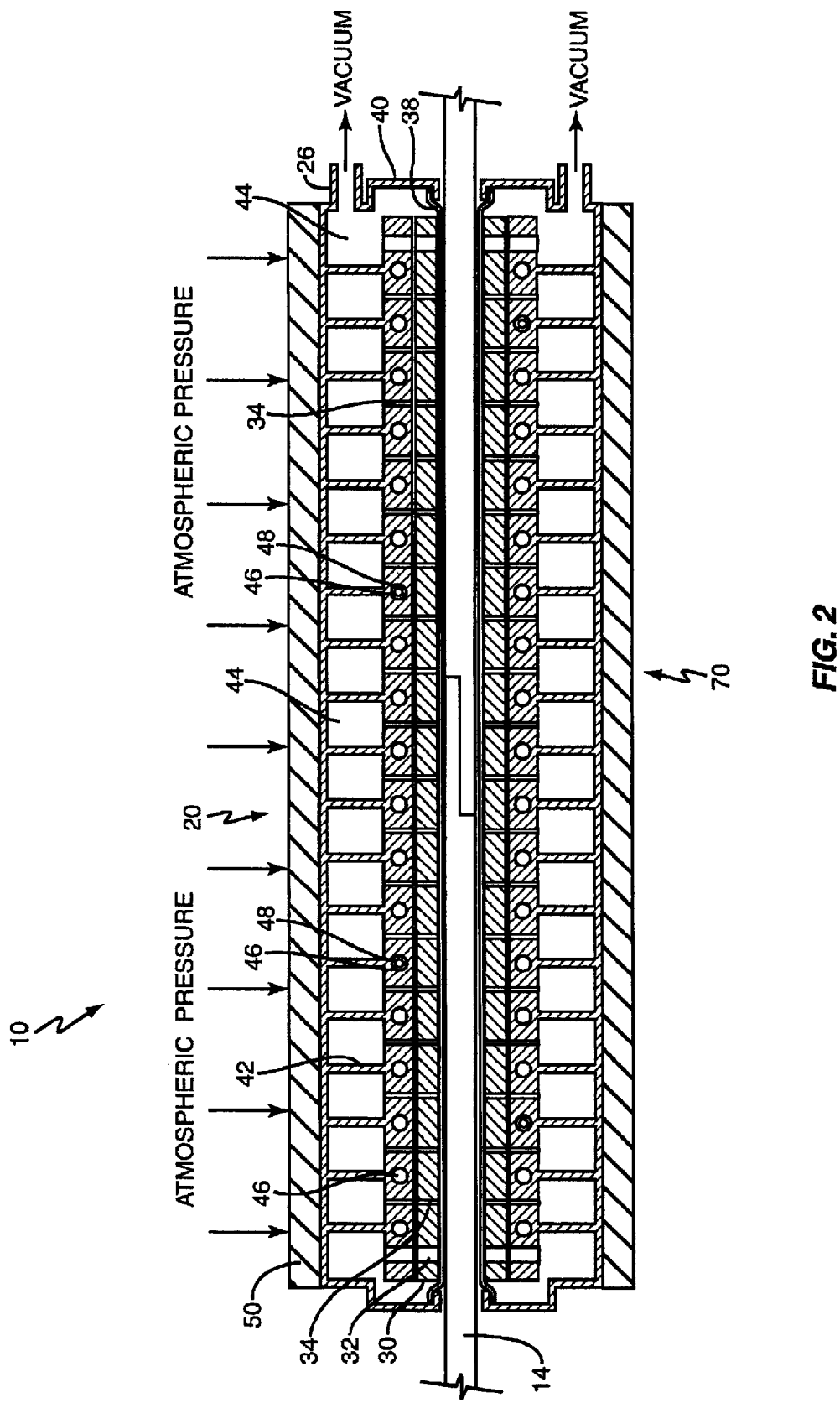
FIG. 2 is a lateral cross-section view of one embodiment of the belt press of the present invention with the release paper removed for clarity.
Figure 3:
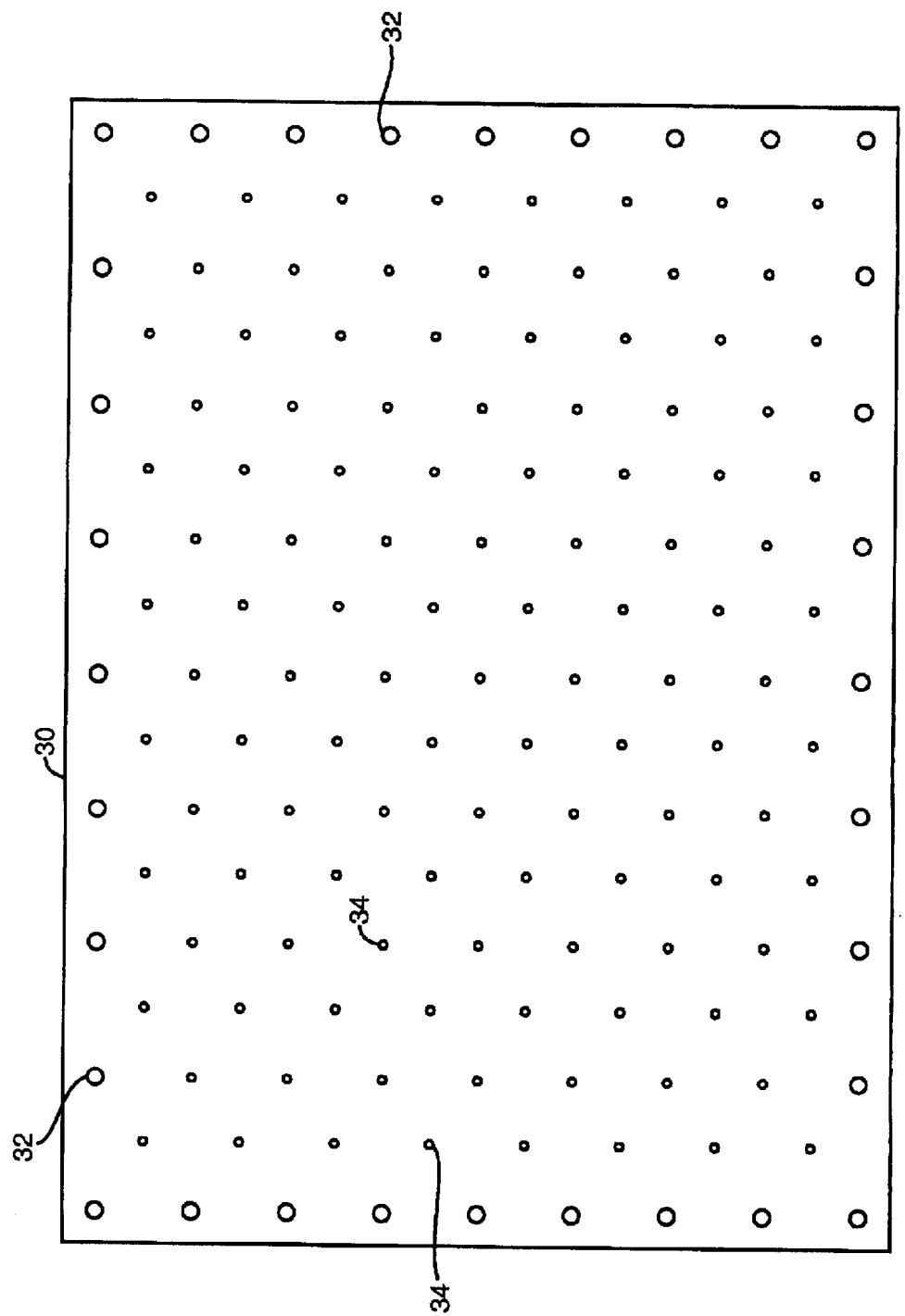
FIG. 3 is a view of the proximal surface of the plate of a platen assembly showing one possible hole location and size relationship.

One embodiment of the belt press 10 of the present invention is shown in FIGS. 1–3. The belt press 10 includes two platen assemblies, which will be referred to as the upper platen assembly 20 and the lower platen assembly 70, and a vacuum source. The upper platen assembly (or the upper platen) 20 is disposed generally parallel to the lower platen assembly (or lower platen) 70, but spaced apart therefrom. The space between the platen assemblies 20,70 is for the belt material 14 to occupy. For ease of reference, the terms "proximal" and "distal," as used herein, relate to distance from the space normally occupied by the belt material 14. Therefore, the proximal side 22 of the upper platen assembly 20 is located proximate the belt material 14 and the distal side is spaced from the belt material 14. Likewise, the proximal side 72 of the lower platen assembly 70 is located proximate the belt material 14 and the distal side is spaced from the belt material 14.

The upper platen assembly 20 has a proximal surface 22 (sometimes referred to as a press surface) and a distal side 24. The upper platen assembly 20 includes a main plate 30 with a mesh layer 38 abutting thereto on its proximal side and a channel frame 40 mated thereto on its distal side. The plate 30 is either substantially rigid by itself or is made substantially rigid through support of other portions of the upper platen assembly 20 (e.g., the channel frame 40 discussed below). The plate 30 may be made from any suitable material, such as aluminum or steel. The plate 30 includes a plurality of holes, which in preferred embodiments may be conceptually divided into perimeter holes 32 and interior holes 34. The perimeter holes 32 are disposed towards the perimeter of the plate 30, while the interior holes 34 are disposed inward of the perimeter holes 32. Better press performance may be achieved when the perimeter holes 32 are larger in size than the interior holes 34, such as an order of magnitude larger. These holes 32,34 may be sometimes referred to herein a "ports" or "vacuum ports" due to their function, as described further below.

The mesh layer 38 is intended to help distribute the contact pressure between the upper platen assembly 20 and the belt material 14 so as to help avoid local deformations of the belt material 14. The mesh layer 38 may be a tightly woven fine mesh and may be permanently joined to the main plate 30. However, the mesh 38 may alternatively be releasably mated to the main plate 30 so that the mesh 38 may be replaced if damaged; for instance, the mesh 38 may be joined to a perimeter frame that attaches to other portions of the upper platen assembly 20 so that the mesh is held against the proximal side of the main plate 30. The perimeter edges of the mesh 38 should be crimped or otherwise sealed to help prevent the entry of air around the perimeter of the mesh 38. Further, there may be a perimeter gasket (not shown) to aid in forming a better seal around the perimeter edges of the mesh 38 and/or upper platen assembly.

The channel frame 40 is a relatively rigid structure typically made from aluminum channels. The channel frame 40 includes a number of holes that connect with a series of internal ducts 44. The internal ducts 44, in turn, connect with one or more vacuum nozzles 26. The internal ducts 44 may be formed, in whole or in part, by suitable reinforcing ribs 42 disposed within the channel frame 40. In addition, the channel frame 40 may include a number of internal conduits 46, with some of the conduits 46 adapted to hold resistance heating elements 48 and other of the conduits 46 adapted to form a cooling water circulation system for cooling the platen assembly 20. In addition, the channel frame 40 may have handles (not shown) disposed at suitable locations on its perimeter to aid in handling the upper platen assembly 20.

The plate 30 and the channel frame 40 are aligned such that the holes 32,34 on the distal side of the plate 30 are aligned with the holes on proximal side of the channel frame 30. In this manner, a flow path is formed from the holes 32,34 on the proximal side of the plate 30 to the vacuum nozzle 26, such that a vacuum pulled at the vacuum nozzle 26 creates a vacuum at the holes 32,34 on the proximal side of the plate 30, via the ducts 44. Further, due to the nature of the mesh layer 38, this vacuum is transmitted to the proximal surface 22 of the upper platen assembly 20.

The upper platen assembly 20 may also include an insulation layer 50, if desired, inside or over the channel frame 40, or at other appropriate locations that do not interfere with the application of vacuum pressure to the proximal surface 22 of the plate 30.

For some embodiments, the lower platen assembly 70 may be simple plate. However, in preferred embodiments, the lower platen assembly 70 is identical to the upper platen assembly 20, but inverted so that the respective proximal surfaces 72,22 face each other. In the preferred embodiments, the two platen assemblies 20, 70 cooperate to generate a compressive force between the proximal surfaces 22,72, as discussed further below. As such, it is preferred that the two proximal surfaces 22,72 be disposed generally parallel on opposite side of the belt material 14 during the compression portion of the press operating cycle.

The vacuum source 80 connects to the vacuum nozzle(s) 26, via one or more suitable hoses. The vacuum source 80 includes a reservoir 82, a valve 84, and a pump 86. The reservoir 82 is designed to hold a "charge" of vacuum. The capacity of the vacuum reservoir 82 should be larger than the capacity of the corresponding vacuum flow path (e.g., ducts 44, etc.), and preferably much larger than, such as an order of magnitude larger. The reservoir 82 may be intermittently or continuously charged using a suitable vacuum pump 86, as is well known in the vacuum art. Valve 84 controls the supply of vacuum pressure to the vacuum nozzle(s) 26.

To illustrate the operation of the belt press 10, it will be assumed that the belt press 10 is being used to join two belt ends 14a,14b to form a belt joint for a continuous belt. However, it is be understood that the belt press 10 may be used in other situations such as for repairing worn spots on belts and the like. The two belt ends 14a,14b are prepared in a conventional fashion and placed near each other on the proximal side of the lower platen assembly 70 so that they overlap in the typical fashion. The belt ends 14a,14b may be placed directly on the lower platen assembly 70, or an optional porous release paper 16, such as silicone coated porous release paper, may be placed between the belt material 14 and the platen assembly 70. The upper platen assembly 20 may then be placed over the lower platen assembly 70, sandwiching the belt material 14 between the two platen assemblies 20,70. Once again, while not required, the porous release paper 16 may be placed between the belt material 14 and the upper platen assembly 20. The respective positions of the platen assemblies 20,70 may be secured prior to application of vacuum, if desired, by suitable light hand clamps or the like. The vacuum reservoir 82 is charged with the valve 84 closed. At this point, negligible force is acting on the belt material 14, essentially only that generated by the weight of the upper platen assembly 20. As the upper platen assembly 20 is preferably relatively light, this force is relatively small. In order to apply the much higher compressive forces desired to form good belt joints, the valve 84 of the vacuum supply 80 is opened (preferably very quickly), thereby supplying vacuum to the vacuum nozzles 26 from the vacuum source 80. This vacuum is transmitted via the internal ducts 44, holes in the channel frame 40, holes 32,34, the mesh 38, and the optional porous release paper 16 (collectively the "vacuum path") to the proximal surface 22 of the platen assembly 20. Any air or other gases present are sucked through the vacuum path, creating a low pressure area under the upper platen assembly 20. The action of atmospheric pressure acting on the distal side of the platen assembly 20 forces the platen assembly 20 downward, as there is little or no corresponding pressure from underneath the platen assembly 20. Thus, the difference between atmospheric pressure and the vacuum pressure supplies the compressive force that pushes the proximal surface 22 of the upper platen assembly 20 against the belt material 14, including the belt ends 14a,14b. Assuming the lower platen assembly 70 is similar to the upper platen assembly 20, the combination of vacuum/atmospheric pressure also supplies the compressive force that pushes the proximal surface 72 of the lower platen assembly 70 against the belt material 14. Assuming that the vacuum pressure is very "low" as measured in psia, the forces on the platens 20,70 may be very large, as the pressure differential may approach 11–14.7 psia. Thus, modest size platens, of dimensions thirty inches by thirty inches, may generate over ten thousand pounds of compressive force.

The use of different size holes 32,34 in the plate 30, with the perimeter holes 32 being larger than the interior holes 34, allows for a grabbing action to occur upon initial vacuum application. However, even the larger perimeter holes 32 should not be so large as to allow "dimples" to form on the belt material 14 when the pressure is applied. The inclusion of the mesh 38 on the proximal side 22,72 of the platen assemblies 20,70 helps prevent the formation of such localized deformations by distributing the vacuum "pull." Likewise, the presence of the channel frame 40 distal from the plate 30 helps more uniformly apply the force from atmospheric pressure against the plate 30, leading to a more uniform application of force against the belt material 14. Further, because the cross-sectional area of the ducts 44 is typically much larger than the cross-sectional area of the corresponding holes 32,34, with each duct 44 preferably serving multiple holes 32,34, good vacuum pull may be generated and/or maintained even when one or more holes 32,34 are experiencing partial actual air flow (ambient air leaking in and/or venting of evolved gases discussed below).

With the pressure applied, via continued application of vacuum pressure at the appropriate vacuum nozzles 26, the heating elements 48 of the channel frame 40 are energized to heat the belt ends 14a,14b. As the belt ends 14a,14b heat up, it is common for the belt ends 14a,14b and/or any adhesive/joint compounds employed to generate evolved gases, sometimes referred to as outgases. These outgases cause significant problems in the prior art, such as by creating bubbles in the belt material 14; this is one reason high forces are required during belt joint formation. In contrast, the belt press 10 of the present invention helps prevent the harmful build up of these outgases by exhausting them through the vacuum path via the "pull" of the vacuum. Thus, the vacuum serves two functions—compressive force generation and outgas exhausting. In addition, the substantial rigidity of the platen assemblies 20,70, particularly the respective plates 30, helps prevent formation of undesirable deformations.

The belt press 10 is held at the desired temperature for a suitable time, such as ten minutes, and then the heating may be terminated so that the belt material 14 may cool. Cooling fluid may be pumped through the conduits 46 in the channel frame 40 to aid in cooling the now-joined belt material 14. After suitable cooling, the compressive pressure may be removed. To release the compressive pressure, the vacuum nozzle(s) 26 are opened to atmospheric pressure, thereby eliminating the vacuum against the proximal sides 22,72 of the platen assemblies 20,70. This "vacuum release" may, for instance, be accomplished by closing the valve 84 and opening an atmosphere inlet (not shown) in the hose leading to the vacuum nozzle(s) 26. The belt material 14 may then be exposed by moving the upper platen assembly 20, and the now-joined belt material 14 may then be removed from the belt press 10.

In the description above, reference has been made to pulling or applying a "vacuum." This term "vacuum" is not used herein in it strict scientific sense (i.e., complete or almost complete lack of pressure), but is instead used herein to indicate pressures significantly below ambient atmospheric pressures. Thus, assuming that ambient atmospheric pressure is 14.7 psia, a pressure of, for example, 8 psia, would be a "vacuum" as that term is used herein.

In one exemplary 30"×30" platen embodiment, the plate 30 may be made from 10 gage or 16 gage aluminum, with the channel frame 40 made from a plurality of approximately one inch tall 16 gage aluminum ribs bent in a wave or z-shape (when viewed from above) disposed above (distally) from a series of ½×2 inch extruded aluminum channels with the conduits 46 formed during extrusion. The mesh 38 is made from approximately 0.020–0.025 inches thick stainless steel, with a mesh size of 100–200 mesh, and a 1½ inch perimeter gasket. The interior holes 34 may be 1/32 inch diameter, with one interior hole 34 per square inch, and the perimeter holes 32 may be ¼ inch diameter, placed one inch apart, generally as shown in FIG. 3. This exemplary 30"×30" platen embodiment produced good results when used with the porous release paper 16.

It should be noted that the use of the porous release paper 16 aids in transferring the vacuum pressure to the belt material 14, and helps prevent the belt material from entering the fine mesh 38 on the proximal side of the platen assemblies 20,70. However, acceptable results might be possible without the porous release paper 16 under some circumstances.

The discussion above has assumed that, when the lower platen 70 is operating similar to the upper platen 20, the vacuum source 80 connects to the vacuum nozzles 26 on both the upper platen 20 and the lower platen 70 via valve 84. However, in such circumstances, the lower platen 70 may alternatively have its own dedicated line to the vacuum source 80 with its own valve and/or the lower platen 70 may have a completely separate vacuum source. Indeed, it is not required that the lower platen 70 be "vacuum powered" like the upper platen 20 in all embodiments. As such, the lower platen 70 is shown connected to the vacuum source 80 via a dashed line in FIG. 1.

The present invention may, of course, be carried out in other specific ways than those herein set forth without departing from the essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of joining two belt ends, comprising:
   disposing the two belt ends between first and second platens, said first and second platens having respective substantially rigid proximal sides, said first platen having a plurality of vacuum ports communicating with said proximal side of said first platen; and
   generating a compressive force between said proximal sides of said first and second platens by pulling a vacuum at said vacuum ports associated with said first platen while allowing atmospheric pressure to act against a distal side of said first platen.

2. The method of claim 1 wherein said second platen has a plurality of vacuum ports communicating with its proximal side, and wherein generating said compressive force between said proximal sides of said first and second platens by pulling a vacuum at said vacuum ports associated with said first platen comprises generating said compressive force between said proximal sides of said first and second platens by pulling a vacuum at both said vacuum ports associated with said first platen and said vacuum ports associated with said second platen.

3. The method of claim 1 further comprising:
   building a vacuum charge in a vacuum reservoir;
   wherein pulling a vacuum at said vacuum ports comprises opening a valve associated with said vacuum reservoir so as to apply said vacuum charge to said vacuum ports.

4. The method of claim 1 wherein pulling a vacuum at said vacuum ports comprises both pulling a vacuum at a first group of ports disposed generally proximate a perimeter of said proximal surface of said first platen and pulling a vacuum at a second group of ports disposed inwardly from said first group, said ports of said first group being larger than said ports of said second group.

5. The method of claim 1 further comprising applying heat to the two belt ends via at least one of said first and second platens while generating said compressive force.

6. The method of claim 5 further comprising venting evolved gases via said vacuum ports while applying said heat.

7. The method of claim 5 further comprising allowing said belt ends to cool after said application of heat, and thereafter relieving said compressive force by ceasing said pulling of said vacuum at said vacuum ports associated with said first platen.

* * * * *